Aug. 7, 1934.     T. E. FAJEN     1,969,361
TOASTER
Filed Jan. 23, 1934     2 Sheets-Sheet 1

INVENTOR
Theodore E. Fajen
BY
James Harrison Bowen
ATTORNEY

Aug. 7, 1934.       T. E. FAJEN       1,969,361
TOASTER
Filed Jan. 23, 1934   2 Sheets-Sheet 2
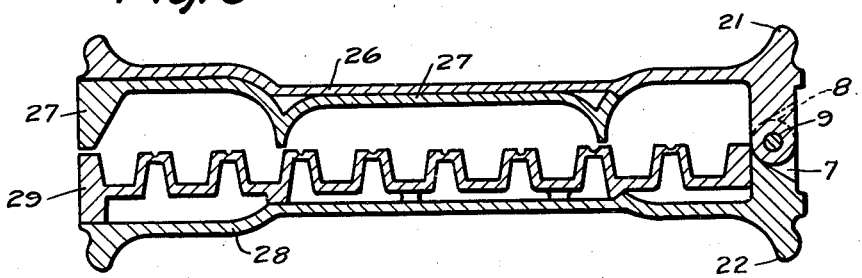
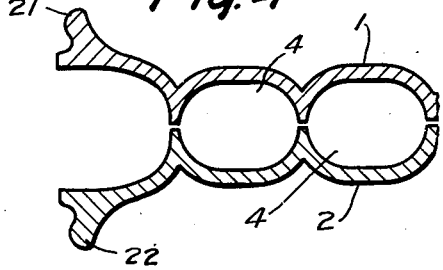
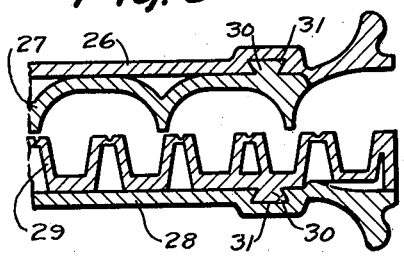
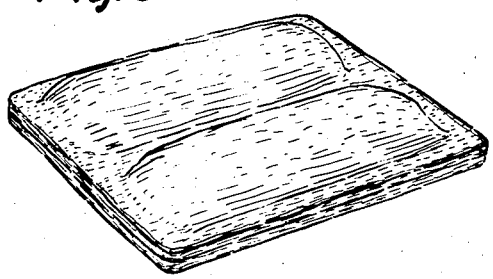
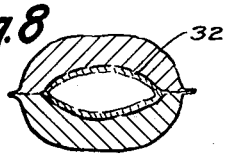
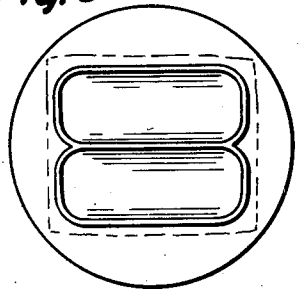
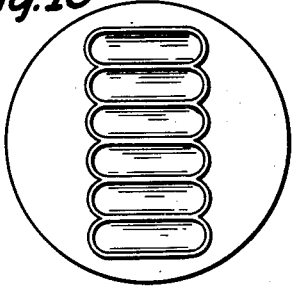
INVENTOR
Theodore E. Fajen
BY
James Harrison Bowen
ATTORNEY Patented Aug. 7, 1934

1,969,361

UNITED STATES PATENT OFFICE 1,969,361

TOASTER

Theodore E. Fajen, Cleveland, Ohio

Application January 23, 1934, Serial No. 707,895

3 Claims. (Cl. 53—10)

The purpose of this invention is to provide means for readily making filled toasted sandwiches from slices of bread and other ingredients.

The invention is a toaster in the form of a grill having pockets over which slices of bread may be placed with filling material between the slices and which is formed with upper and lower corresponding members so that the upper member may be pressed downward on top of the sandwich, and when heat is applied both sides of the sandwich, or sandwiches, may be toasted and the edges thereof sealed. The device may be provided for making one or more sandwiches at one time and one or more of said sandwiches may be made from two slices of bread.

This device is similar to a waffle iron and waffle irons have been made in various shapes. However, these devices make the product from dough, whereas this device utilizes the same principle to form toasted sandwiches from slices of bread, and in doing so it is essential that the bread be squeezed together around the filler and the edges thereof sealed in such a manner that the crust or outer edges may be broken away, and also so that the individual sandwiches may be separated.

The object of the invention is, to provide a device in which toasted sandwiches may readily be formed from slices of bread with filling material therebetween.

Another object is to provide a toaster in which toasted sandwiches may be made from slices of bread which seals the edges of the sandwiches.

Another object is to provide toasted sandwiches with slices of bread having a filling material between and in which the edges are held together.

Another object is to provide a device for forming individual filled toasted sandwiches from slices of bread in which the sandwiches may be readily broken apart.

A further object is to provide a toaster having dies for forming products in which the dies may be interchangeable.

And a still further object is to provide a device for forming filled toasted sandwiches from slices of bread and filling material which is of a simple and economical construction.

With these ends in view the invention embodies a toaster in the form of a grill having upper and lower members with dies forming pockets, between which slices of bread and filling material may be placed and having means for heating said members, and means may also be used for securing the members together.

Other features and advantages of the invention will appear from the following description taken in connection with the drawings, wherein:

Figure 3 is a section similar to that shown in Figure 1 with parts omitted and with removable die members.

Figure 4 is a cross section showing one side of the device shown in Figure 1.

Figure 5 is a similar section showing a portion of the device shown in Figure 3.

Figure 6 is a view showing two slices of bread formed into sandwiches as they would appear after being removed from the toaster.

Figure 7 is a detail showing one of the sandwiches with the outer edge or crust broken away.

Figure 8 is a cross section through one of the sandwiches.

Figure 9 is a view showing an alternate design in which the device is provided for forming two sandwiches from two slices of bread, whereas, the device shown in Figure 1 is designed for forming four sandwiches.

Figure 10 is a similar detail showing a greater number of pockets in which each slice of bread, or two slices of bread, may be formed into three sandwiches.

Figure 1:
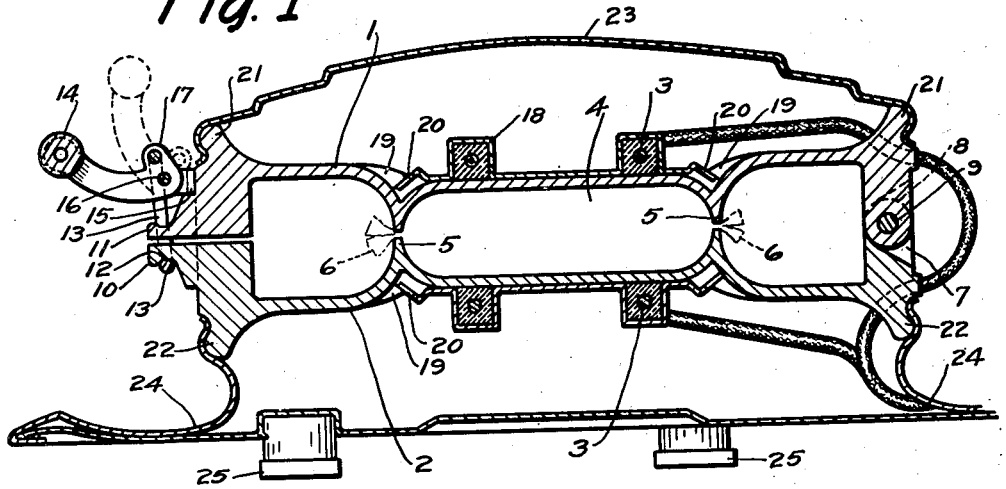
Figure 1 is a view showing a cross section through the device.

In the drawings the toaster is shown as it would be made wherein numeral 1 indicates the upper member, numeral 2 the lower member and numeral 3 an electric heating element.

The members 1 and 2 are preferably similar so that they may be made from the same die or pattern. In the design shown in Figures 1 and 2 these members are formed with pockets 4 which may be arranged in pairs with a space provided between the two sets of pockets. These pockets may be of a rectangular shape as shown or may be of any shape or design and may be arranged in any manner. The device may be provided with two sets of pockets having two pockets in each set as shown in Figure 2, or may be provided with three pockets in each set as shown in Figure 10, or any number of pockets may be provided. In the design shown in Figure 9 the device is provided with only two pockets which may be of such a size that a slice of bread may be placed over them with the edges slightly protruding as indicated by the dotted lines. The toaster in this design is comparatively small, and it will be understood that the device may be of any size and may be made to accommodate any number of slices of bread or to make any number of sandwiches.

These pockets are formed in the members 1 and 2 and these members may be cast, die cast, or stamped from sheet material, or formed in any manner. The pockets are formed with substantially thin abutting edges 5 which will squeeze the bread together at these points and as the edges become heated they will cement the two slices of bread together and practically burn the bread at these points so that the protruding edges, as indicated by the numeral 6 and shown in dotted lines in Figure 1, may readily be broken off after the sandwich is toasted and the individual sandwiches may readily be broken apart.

The members 1 and 2 are provided with projecting lugs 7 and 8 at the rear which will dove-tail together to form a hinge which may be held by a pin 9. This hinge is arranged so that the member 1 may be raised and moved upward and backward beyond the vertical position where it may rest while the material for the sandwiches is being placed upon the lower member. This hinge may be of any type or design and may be arranged in any manner.

Figure 2:
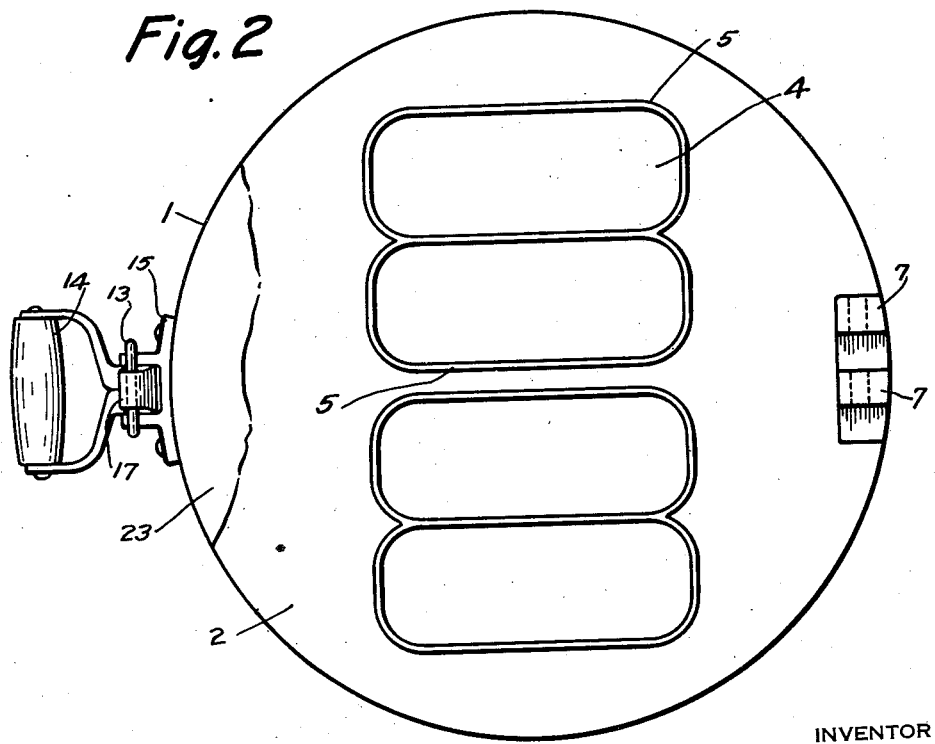
Figure 2 is a plan view with part of the upper member broken away.

At the opposite side of the device the members 1 and 2 are provided with lugs 10 and 11 having recesses 12 therein by which the members may be held together by a link 13 as shown in Figure 1. The link 13 is suspended from a handle 14, and the handle 14 is pivotally mounted on the front of member 1 through a bracket 15 and a pin 16. The inner end of the handle is provided with a projection 17 in which the link 13 is held and it will be noted that as the handle is moved downward from the position shown in dotted lines in Figure 1 to that shown in full lines the link will move over the projection 10 and the projection 17 will pass over the center of the pin 16 to the position shown, thereby locking the two members together. It will be understood that the locking means may be omitted and the handle made stationary, and also that a handle or locking means of any other type or description may be used.

In the design shown in Figure 1, the heating element 3 is provided with a thin casing 18 and the edges of this casing may be held under lugs 19. The edges of the casing may be provided with slots 20 which may be placed over the lugs and then the casing may be moved slightly so that the edges may be caught under the lugs, as shown. It will be understood that heating elements of any other type or description may be used and these may be mounded upon or attached to the toaster in any manner.

The upper and lower surfaces of the members 1 and 2 are formed with rings 21 and 22 and a cover 23 may be snapped over the ring 21 on the member 1 and a base 24 snapped over the ring 22 on the member 2. The cover and base may be of any type or design, may be made of any material and may be attached to the members 1 and 2 in any manner or by any means. The base 24 may be provided with feet 25 which may be made of rubber or any material and these may be held in the base in any manner and as many feet as may be desired may be used.

In the design shown in Figure 3 the members 1 and 2 are formed so that the dies or grids are removable. In this design the upper member 26 is shown having a die 27 therein corresponding with the die shown in Figure 2 and the lower member 28 is shown with a grid 29 which may be used for waffles or the like. The members 27 and 29 may be held by dove-tailed projections 30 which slide into grooves 31 in the members 26 and 28, however, it will be understood that these members may be held in any position, or by any means. It will also be understood that dies, molds or grids of any other design may be provided with the device so that it may be used for making sandwiches, waffles or any products.

It will be understood that other changes may be made in the construction without departing from the spirit of the invention. One of which changes may be in the use of other means for mounting or holding the members 1 and 2, another may be in the use of other means for heating the members, as it will be understood that the device may be placed over a gas flame, canned heat, or on a stove, or heated in any manner. Another change may be in the use of other means for mounting the forming members or for holding these members together, and still another may be in the use of these members in combination with any other device, or devices.

The construction will be readily understood from the foregoing description. In use the device may be provided as shown and described with the electric elements connected to any suitable source of electric current and, with the upper member raised a slice of bread may be placed upon the pockets, a filling ingredient placed upon the bread and then another slice placed on top. The cover may then be lowered and by pressing it downward the edges 5 will be forced substantially through the bread thereby compressing the bread at the edges and by holding it in this manner under a high temperature this portion of the bread will brown considerably so that it may be easily broken and therefore the protruding edges may readily be removed and the individual sandwiches may easily be broken apart. At the same time the hot surface of the pockets will toast the bread and mold it into the shape shown in Figure 8. If the sandwich is filled with cheese, the cheese will melt and substantially line the interior as indicated by the lines 32 shown in Figure 8. Altho cheese is referred to, it will be understood that any other product may be used for filling, and altho it is preferred to use slices of bread as the covering material, it will be understood that any other edible substance may be used and this may be cooked, baked or toasted by the device as may be desired.

The outer surfaces of the slices of bread may be buttered before placing them in the toaster.

It will be understood that the toaster may be made in the form of any grill now in use and any standard equipment may be used therewith, such as temperature indicators or thermostatic controls or other means for indicating the temperature, or for controlling or shutting off the current.

Having thus fully described the invention what I claim as new and desire to secure by Letters Patent, is:

1. A toaster comprising upper and lower forming members between which slices of bread with a filling material between may be placed and by which said slices of bread and material may be toasted and formed into sandwiches, said toaster having a continuous chamber around said forming members to receive the edges of said slices of bread.

2. In a device of the character described; two corresponding forming members between which material may be placed, means heating said members, said members adapted to form the material into sandwiches with the edges of said sandwiches sealed and said device having a continuous open area around said forming means to accommodate the edges of said material.

3. A toaster comprising heated dies adapted to hold slices of bread together with filling material therebetween and form said bread and material into sandwiches with the edges sealed and from which protruding edges may be broken, said toaster having a continuous area around the dies to receive the protruding edges of the bread.

THEODORE E. FAJEN.